United States Patent [19]
Jurewicz et al.

[11] Patent Number: 5,323,385
[45] Date of Patent: Jun. 21, 1994

[54] SERIAL BUS COMMUNICATION METHOD IN A REFRIGERATION SYSTEM

[75] Inventors: Romuald M. Jurewicz, St. Louis Park; Michael D. McCormack, Robbinsdale; Dannis R. Johnson, Savage, all of Minn.

[73] Assignee: Thermo King Corporation, Minneapolis, Minn.

[21] Appl. No.: 10,092

[22] Filed: Jan. 27, 1993

[51] Int. Cl.[5] .............................................. H04L 5/14
[52] U.S. Cl. ..................................... 370/43; 370/85.1; 370/99; 340/825.17
[58] Field of Search ...................... 370/85.1, 43, 94.1, 370/99, 79, 110.1, 82, 83; 340/825.06, 825.07, 825.5, 825.1, 825.52, 825.53, 825.57, 825.62

[56] References Cited

U.S. PATENT DOCUMENTS 5,050,166   9/1991   Cantoni et al. ...................... 370/82

OTHER PUBLICATIONS

John D. Spragins, "Telecommunications Protocol and Designs" 1991, pp. 323–327.

Intel "82526 Serial Communication Controller Architectural Overview", 1989, pp. 17–34.

Automotive Products Handbook 1990–Intel Corporation Literature Order No. 231792-004 pp. 7-1 through 7-45.

Primary Examiner—Douglas W. Olms
Assistant Examiner—Huy D. Vu

[57] ABSTRACT

A method of communication in a refrigeration system, between communication nodes connected to a serial data bus using Controller Area Network protocol (CAN) having a message frame format which includes a data field. The method includes converting a byte of the data field of each message frame to a permanent data descriptor expansion byte (DEB). In at least the first frame of a message a specific bit of the DEB is set to a first logic level to indicate a control frame, and information descriptive of the whole message is loaded into the remaining bits of the DEB, and data field. In each remaining frame of a message following a control frame, or control frames, the specific bit is set to a second logic level, to indicate a data frame. A block of data is loaded into the data field of each data frame, and index information specific to the associated block of data is loaded into the remaining bits of the DEB.

8 Claims, 5 Drawing Sheets

| CLASS NAME | 11 BIT IDENTIFIER | | | | | | | | | | |
|---|---|---|---|---|---|---|---|---|---|---|---|
| | CLASS | | | | | MEMBER | | | | | |
| GLOBAL DATA TABLE | 0 | 0 | 0 | 0 | 0 | 0 | 0 | 1 | X | X | X |
| DATA LOGGER | 0 | 0 | 0 | 0 | 0 | 0 | 1 | 0 | X | X | X |
| REMOTE LOG-ON ID | 0 | 0 | 0 | 0 | 0 | 1 | 1 | 1 | X | X | X |
| COMPRESSOR CONTROL | 0 | 0 | 0 | 0 | 1 | X | X | X | X | X | X |
| ENGINE CONTROL | 0 | 0 | 0 | 1 | 0 | X | X | X | X | X | X |
| EVAPORATOR CONTROL | 0 | 0 | 0 | 1 | 1 | X | X | X | X | X | X |
| ATMOSPHERE CONTROL | 0 | 0 | 1 | 0 | 0 | X | X | X | X | X | X |
| MOTOR SPEED CONTROL | 0 | 0 | 1 | 0 | 1 | X | X | X | X | X | X |
| HUMIDITY CONTROL | 0 | 0 | 1 | 1 | 0 | X | X | X | X | X | X |
| REMOTE SENSOR MODULE | 1 | 0 | 0 | 0 | 0 | X | X | X | X | X | X |

FIG. 2

SERIAL BUS COMMUNICATION METHOD IN A REFRIGERATION SYSTEM

TECHNICAL FIELD

The invention relates in general to communications over a serial bus in a refrigeration system, and more specifically to a method for adapting a serial communication protocol designed specifically for in-vehicle networking in the automotive industry to a broader use.

BACKGROUND ART

The automotive industry, in order to reduce the number of wires which must be run to electrical and electronic modules located in different parts of a vehicle, has evolved to a distributed type of multiplexed control. This distributed control arrangement utilizes computers located at certain of the modules which are connected together via a twisted pair, or coaxial or fiber optic cables, in a computer communications network. In order to communicate effectively between the various in-vehicle modules, Robert Bosch GmbH and Intel Corporation introduced a set of communication rules or protocol at the Society of Automotive Engineers trade show in February, 1986, which is currently implemented in the Intel 82526 Serial Communications Controller. This protocol, which is called CAN for "controller area network", supports a network of multi-master nodes, performing non-destructive bit-wise arbitration of messages with functional addressing.

It would be desirable to be able to use the serial communications controller chips, such as the Intel 82526, developed for in-vehicle networking, in refrigeration related applications, such as in transport refrigeration systems or units.

The fixed message frame format of the CAN protocol, however, while suitable for automotive use, is too limiting for the communications involved between refrigeration related control modules. For example, large amounts of information are required to be collected and transmitted between different refrigeration control modules, which information is operated upon by diagnostic programs, with system status, along with specific detected alarm conditions being displayed locally and/or remotely. Raw data, system status and alarm conditions must be readily available for remote monitoring functions. Examples of remote monitoring functions include remote monitoring arrangements which utilize electric power lines, including ship-board wiring in container refrigeration applications, satellite communications in over-the-road truck and trailer refrigeration applications, and the like. The information must also be readily available for down loading via plug-in data loggers, and refrigeration controls must be able to be initialized to a predetermined application by a plug-in data pack, and quickly and easily re-initialized to accommodate a different conditioned load having different refrigeration requirements, including temperature, humidity, and special protective atmospheres, such as by downloading specific program constants and/or application specific programs to a central computer node and/or flash programmable read-only memories (PROM) in the distributed network.

SUMMARY OF THE INVENTION

Briefly, the present invention is a method of two-way communication between a central communication node and remote nodes via a serial data bus using Controller Area Network (CAN) protocol having a fixed message frame format which includes a combined identification and arbitration field and a data field. The method includes the step of converting a predetermined portion of the data field of each message frame, such as the first byte, to a permanent data descriptor expansion byte (DEB).

The method further includes setting a predetermined bit of the DEB, such as the most significant bit (MSB), to a first logic level in at least the first frame of a message, to indicate a control frame. In a control frame the method includes the steps of loading information descriptive of the whole message in the remaining bits of the DEB, and in the remaining data field. The method includes setting the predetermined bit of the DEB to a second logic level in each subsequent frame of the message, to indicate a data frame. In a data frame the method includes the steps of loading a block of data in the data field of each data frame, and loading index information in the remaining bits of the DEB in each data frame which is specific to the data of the associated data frame. The index data enables a receiving node to keep track of the position of the data in each data frame relative to the overall stream of data blocks in a specific message, as a message may be interrupted between data frames by higher priority messages.

The method also utilizes the DEB for connecting new remote modules to the serial communications bus. The method includes the steps of loading a notification of such an initial log-on request in a combined identification and arbitration field of the first frame of an initial message transmission by a newly connected remote node, setting a predetermined bit of said DEB to the first logic level in the first frame of the message, to indicate a control frame, and loading initial log-on identifier information in the remaining bits of the DEB and in the remaining data field, of the control frame, which identifies the newly connected node, and storing the remote identifier information at the central communication node.

BRIEF DESCRIPTION OF THE DRAWINGS

The invention will become more apparent by reading the following detailed description in conjunction with the drawings, which are shown by way of example only, wherein:

FIG. 2 is a chart which sets forth an example of refrigeration device identifiers which, in addition to identifying a specific communication node, also includes a bus priority indication of the node relative to other communication nodes which are presently connected to the network, as well as/to nodes which may be connected to the network in the future;

DESCRIPTION OF PREFERRED EMBODIMENTS

Figure 1:
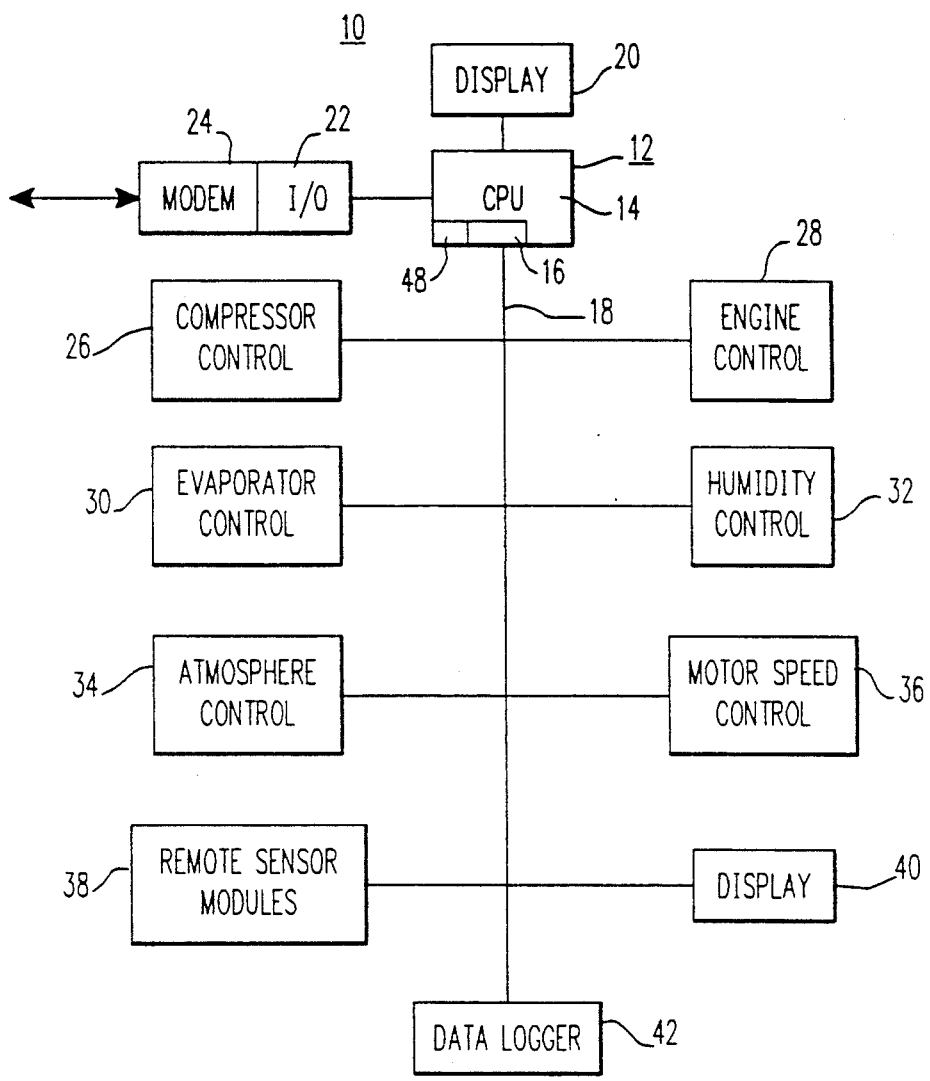
FIG. 1 is a block diagram of a refrigeration system of the type which may utilize the methods of the invention.

Referring now to the drawings, and to FIG. 1 in particular, there is illustrated a block diagram of a refrigeration system 10 typical of the type of refrigeration system which may be controlled according to the teachings of the invention. Refrigeration system 10 includes a central communication node 12, which comprises a microprocessor, such as Intel's 80C196KB, having a central processing unit or CPU 14. The central communication node 12 further includes a serial communications controller 16, such as Intel's 82526, which is connected to a serial communications bus 18, such as a twisted pair, or a coaxial or fiber optic cable. In addition to serial bus 18, central communication node 12 may be connected to a local display 20, and to remote monitoring devices via electrical power lines, radio transmitters, and the like, via an input/output board (I/O) 22 and a modem 24.

Examples of remote communication nodes which may be connected to the serial communications bus 18 include a refrigerant compressor controller 26; a compressor prime mover engine controller 28; a refrigerant evaporator controller 30; a conditioned load humidity controller 32; a conditioned load atmosphere controller 34; a motor speed controller 36, such as compressor prime mover motor, fan and blower motors, and the like; remote sensor modules 38, such as temperature, pressure, and speed sensors; a display 40; and a data logger or data pack 42. The data logger or data pack 42 may access the central communication node 12 via bus 18, as illustrated, or directly via a serial port associated with the microprocessor 14.

In the CAN protocol, bus arbitration is performed by assigning each node an eleven bit message identifier which is placed in the initial field of a message frame, called an arbitration field. The arbitration field, in addition to the message identifier, includes a bit, called RTR, which is set dominant by a node transmitting data and recessive by a node requesting data. The identifier is unique to only one message, and it thus represents the name of the associated message. The identifier appears in the message of a node responsible for transmitting data over the bus 18 for such a message, and it appears in the message of a node requesting that data relative to this specific message be transmitted over the bus 18.

The identifier also indicates the priority of each specific message. All messages are prioritized, with the message having the highest priority being assigned an identifier having the smallest digital value. The next to the highest priority message is assigned the next to the smallest digital value, etc., down to the message having the lowest priority, which is assigned the largest digital value. Transmit logic of a node makes a bit-by-bit comparison between the message it is transmitting and the bus level. When two nodes happen to transmit on bus 18 simultaneously the node having the lower priority will have a recessive bit, e.g., a logic one, earlier in the message identifier, which will be over-written by a dominant bit, e.g., a logic zero, of the higher priority message. Upon detecting this, the node transmitting the lower priority message will stop transmitting and become a listener. When a node requesting that a specific message be sent happens to transmit simultaneously with a node responsible for generating and transmitting this specific message, the hereinbefore mentioned RTR bit, which is set dominant in a node transmitting data, and recessive in a node requesting data, will automatically result in a requesting node ceasing to transmit, enabling this node to immediately receive the data it is requesting.

FIG. 2 is a chart 44 illustrating ten examples of eleven-bit message identifiers 46 assigned to messages by nodes transmitting data relative to the identified message, and by nodes requesting that data associated with the identifier be transmitted. The smallest digital value and thus the highest message priority starts at the top row 48 of chart 44, and the digital values increase and the priority decreases at each lower row of the chart. The top row 48 is assigned to the global data table, and the global data table will be hereinafter identified as global data table 48.

The eleven bit message identifier 46 is divided into thirty six classes by the five most significant bit positions, with each class thus having a five bit class number 50. Each identifier has a name 52 assigned to it. Each class has sixty four members associated with the six least significant bits. Each class member thus has a six digit class member number 54 assigned to it.

The highest priority is assigned to messages associated with a global data table 48 maintained at the central communication node 12. Thus, when serial communications controller 16 of the central communication node 12 is transmitting information taken from the global data table 48, all other nodes will become listeners, even if they started transmitting at precisely the same time. The next highest priority message is related to the data logger or data pack 42, and the third highest priority is given to a remote node's initial logging-on transmission. The first three highest priority messages may all be members of class 0 0000, for example. The table then continues, down to the lowest priority messages labeled "remote sensor module", which class is associated with the hereinbefore mentioned temperature, pressure and speed sensors.

Figure 3:
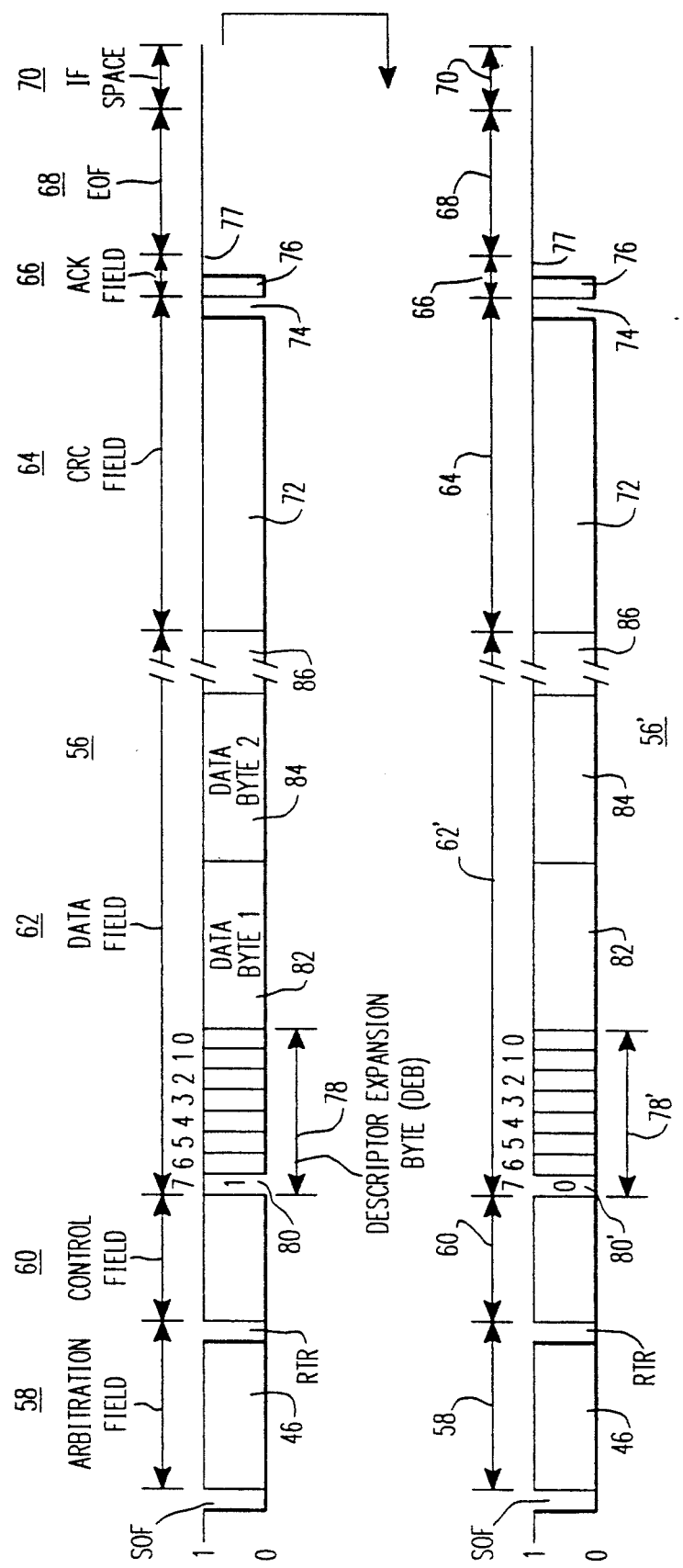
FIG. 3 illustrates a message format which implements a first serial bus communication format according to the teachings of the invention, which is used by a central communication node as well as other high data density devices, such as a data logger.

FIG. 3 illustrates a message frame format which includes frames 56 and 56' which are utilized by the CAN protocol, and modified according to the teachings of the invention. Message frame 56 starts with a start-of-frame bit SOF and includes a twelve bit arbitration field 58; a six bit control field 60; a data field 62, which may be up to and including sixty four bits long, or eight bytes; a sixteen bit cyclic redundancy code (CRC) field 64; a two bit acknowledge (ACK) field 66; and, a seven bit end-of-frame field 68. Adjacent frames are separated by at least a three bit inter-frame space 70.

In the example of message frame 56, the "recessive" level is logic one, and the "dominant" level is logic zero. The start-of-frame bit SOF is a single dominant bit which synchronizes the receiving nodes. The arbitration field 58 includes the hereinbefore mentioned eleven bit message identifier 46 and the hereinbefore mentioned RTR bit. It is assumed that data frame 56 is transmitting data associated with the message identifier 46, and thus the RTR bit is set dominant, which will take priority over a simultaneous request by a node for data to be transmitted relative to the same message identifier, as the RTR bit of a node requesting that data be sent is set recessive.

The control field 60 includes four bits which are used to indicate the data byte count included in frame 56, and two reserve bits. The data field 62 will be discussed last, as the data field 62 is modified according to the methods of the invention. The CRC field 64 includes a 15 bit CRC check sum 72 and a one bit recessive CRC delimiter bit 74. The ACK field 66 includes an ACK slot 76 and a one bit recessive ACK delimiter bit 77. Each frame 56 is delimited by an end-of-frame bit sequence of seven recessive bits in the end of frame field 68. The inter-frame space 70 consists of at least three recessive bits, after which the bus 18 goes idle, allowing another frame 56 of the same message to start, or allowing a higher priority message to interrupt a lower priority message. A frame requesting that data be transmitted is similar to frame 56, except the RTR bit is set recessive, instead of dominant, and the frame contains no data.

While the frame format just described is suitable for automotive in-vehicle networking, it is not suitable for use in a complex refrigeration system, such as refrigeration system 10 set forth in block form in FIG. 1. In such a complex refrigeration system it is desirable to be able to transmit messages of much longer length than presently allowed by the frame format of the CAN protocol, e.g., to be able to have each frame to transmit a piece of the total data block being transmitted, along with a count of the number of data blocks being transmitted in all of the frames of a message, and an end-to-end CRC of such an expanded data message. It would also be desirable to be able to specify the eleven bit identifier associated with a remote node, when the message is directed to a specific remote node. When the message includes data from the global data table 48 associated with the central node 12 it would also be desirable to identify a specific algorithm associated with the data, as well as a block number associated with the algorithm. Finally, using the CAN protocol as modified to include the above stated desirable features, it is desirable to be able to index each block of data in each frame to indicate where in the overall block of data this piece of data belongs. This is desired, as a message of several frame lengths may be interrupted between any two frames at any time by a higher priority message.

Figure 4:
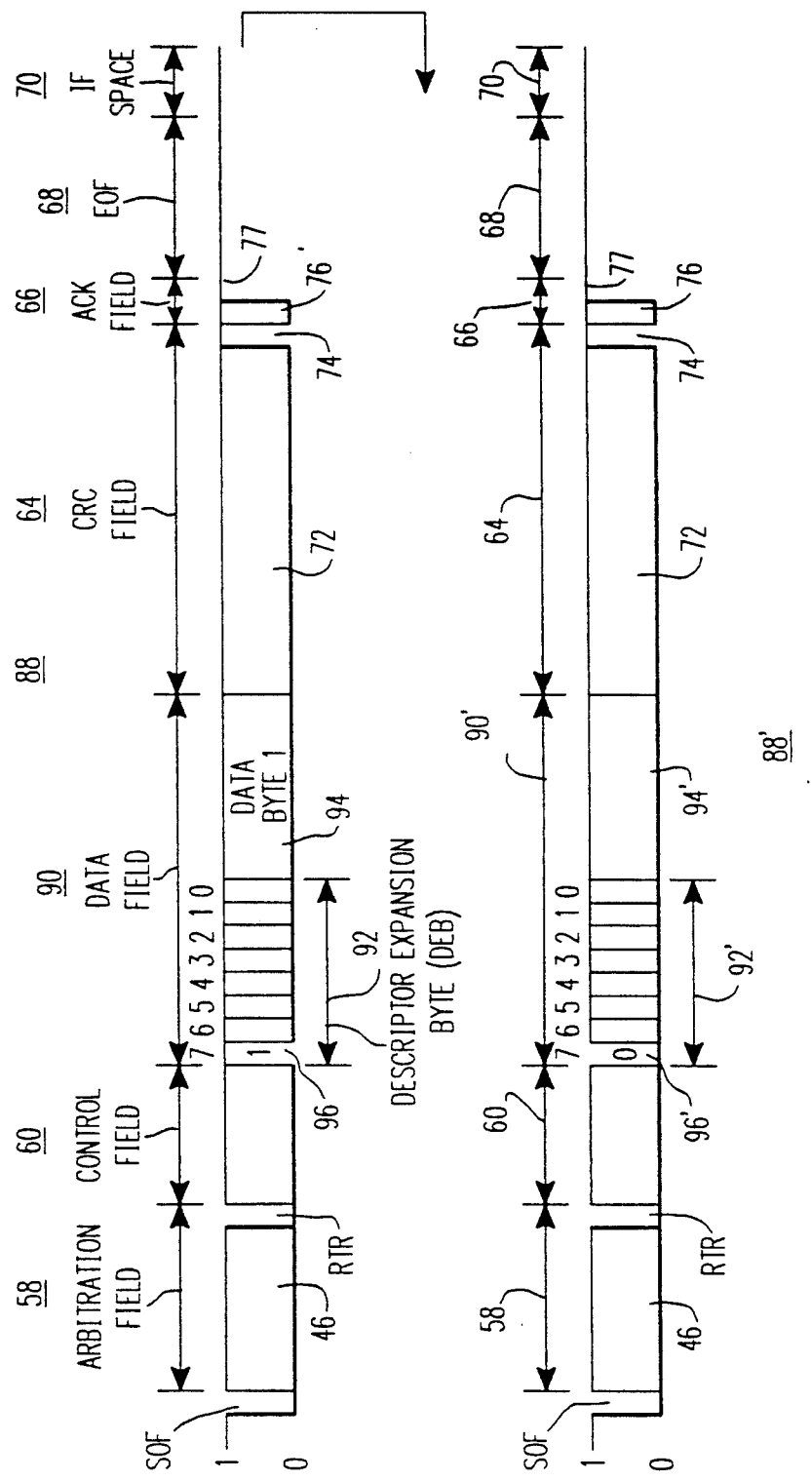
FIG. 4 illustrates a message format which implements a second serial bus communication format according to the teachings of the invention, which is used by all remote devices connected to the serial bus except a data logger.

According to the teachings of the invention, each message that includes data, and each message requesting that data be transmitted, includes one or more initial frames, which will be called control frames, and one or more additional frames, which will be called data frames, with the number of data frames depending upon the total number of data bytes being transmitted in the message. For purposes of example, when data is being sent from the global data table 48, and data transfers associated with the data logger or data pack 42, each data frame will include more than one byte of data. In data transfers made by the remote nodes, each data frame will include only one byte of data. FIG. 3 illustrates the invention for message frames associated with the global data table 48 and other high data density nodes, such as the data logger or data pack 42, while FIG. 4 illustrates the invention for message frames associated with data transfers made by low data density nodes, such as the remote nodes shown in FIG. 1.

According to the teachings of the invention, a selected portion, e.g., the first byte 78, of the data field 62 in each frame of the message is permanently designated as a descriptor expansion byte (DEB), which will be called DEB 78 in control frame 56 and DEB 78' in frame 56'. Further, a predetermined bit of each DEB 78 and 78', e.g., the most significant bit (MSB) 80 and 80', respectively, is a control bit, with the logic level of control bit 80 determining what is to be transmitted in the remaining bits of DEB 78 and 78', and in the remaining byte, or bytes, of the data fields 62 and 62'.

Referring first to FIG. 3, which is the format for data transfers related to the global data table 48 and other high data density nodes, such as the data logger or data pack 42, the control bit 80 of the first or initial frame 56 of a message is set to a predetermined logic level, e.g., recessive (logic one), which indicates that the frame is a control frame, and the control bit 80' in each subsequent frame 56, of the message is set to the opposite logic level, e.g., dominant (logic zero), which indicates the frame is a data frame transferring data.

When bit 80 of DEB 78 of control frame 56 is a logic one, and the message identifier 46 indicates a message associated with the global data table 48 or with other high data density nodes, such as the data logger or data pack 42, the remaining seven bits 0-6 of DEB 78 define a count of the total number of data frames 56' to follow. Thus, the remaining seven bits 0-6 can specify a count of up to and including 128, which count value indicates the number of blocks of data to follow in a like number of frames, as part of a single message. When all seven remaining data field bytes are utilized, for example, a count value of 128 would indicate that 128 seven-byte blocks of data will follow. The first and second bytes of the remaining data field 62, referenced 82 and 84, respectively, include the high and low order bytes of an end-to-end CRC of the data included in the count value of data blocks indicated by bits 0-6 of DEB 78. When the data being transmitted is directed to a specific remote node, the eleven bit identifier used by the node to identify messages which emanate therefrom is placed in bytes three and four, indicated generally by reference 86. When the data is from the global data table 48, or to be stored therein, bytes five and six of the data field, also indicated generally by reference 86, respectively designate the algorithm associated with the data being sent, and the block number of the associated algorithm.

In the following frame 56', bit 80 of DEB 78' is set to logic zero, to identify frame 56' as a data frame, as opposed to a control frame 56. In this instance, the remaining bits 0-6 of DEB 78' are an index into the data block being transmitted by the remaining bytes of the data field 62'. For example, if frame 56' is sending the first seven-byte block of data, the index number in bits 0-6 of the DEB will be 000 0000. In the next data frame 56', which sends the second seven-block of data, bits 0-6 of the DEB will be 000 0001, etc. Thus, a receiving node can easily determine which piece of the data is being received in each data frame 56', and when the message is interrupted between frames thereof, the indexing information will direct the storing of the data so the data will be stored in the proper sequence.

FIG. 4 illustrates message frames 88 and 88' associated with data transfers made by each low data density remote node of the distributed communications network. For purposes of example, first describing message frame 88, each data field 90 is limited to two bytes, a descriptor expansion byte (DEB) 92, and a byte 94. All other fields of data frame 88 are the same as data frame 56 in FIG. 3, and are indicated by like reference numbers. In like manner, message frame 88' is limited to two bytes, a DEB 92' and a byte 94'.

In the first frame 88 of a data message from a low data density remote node, as well as in as many following frames as are necessary, since the format of FIG. 4 does not contain the relatively large number of bytes in the data field as the format of FIG. 3, the MSB 96 of DEB 92 is set to a logic one, to indicate a control frame. When bit 96 is a logic one, bits 4–6 of DEB 92 are used to indicate the type of remote serial message to follow in one or more data frames 88', with data frames being identified by bit 96' of DEB 92' being low. Bits 0–3 of DEB 92 are an index into the type of information contained in the remaining data byte 94 of the control frame 88.

More specifically, when bit 96 of DEB 92 is high, bits 4–6 have the following meanings:

When bits 4–6 of DEB 92 are "000", the message is a request for data from the global data table 48. In this message, each byte 9, of the message to come when bit 96' of DEB 92' is low sets forth a global data table identifier for information to be sent from the global data table 48 in an ensuing directed data message from the central communication node 12.

When bits 4–6 of DEB 92 are "001", the message is a "write" to the global data table. In this type of message every three successive bytes 94' of the data frames 88' to come, when bit 96' is low, includes a global data table identifier in the first of the three bytes and then two bytes of data in the remaining two bytes to be written in the global data table 48.

When bits 4–6 of DEB 92 are "010", the message is a request for a transmission from the data logger or data pack 42. In this message each byte 94' of the message frames 88' to come when bit 96' is low is a byte to be sent, once the message is complete, as part of a message to a predetermined task function located at the central communication node 12. The eleven bit identifier of the requesting node is appended to the message sent to this predetermined core function, and this function will interpret the data and respond to it.

When bit 96 of DEB 92 is high, bits 0–3 have the following meanings:

When bits 0–3 of DEB 92 are "0000", byte 94 in control frame 88 is a count of the total number of data blocks to be transmitted in the data frames 88' indicated by a low or logic one bit 96' in DEB 92'. Thus, byte 94 can indicate that up to 128 one-byte blocks of data will follow as part of this single message.

When bits 0–3 of DEB 92 are "0001", byte 94 in control frame 88 is the first or high order byte of an end to end CRC of the data being sent in the subsequent data frames 88' of the message.

When bits 0–3 of DEB 92 are "0010", byte 94 in control frame 88 is the second or low order byte of an end to end CRC of the data being sent in the subsequent data frames 88' of the message.

When bits 0–3 of DEB 92 are "0011", byte 94 in control frame 88 indicates the algorithm to be used in conjunction with the data to be transmitted in data frames 88' as part of the message.

When bits 0–3 of DEB 92 are "0100", byte 94 in control frame 88 indicates the block number of the associated algorithm.

In data frame 88', when bit 96' of DEB 92' is low, the remaining bits 0–6 of DEB 92, are an index into the position of the data in byte 94' relative to the data in the total number of data blocks being transmitted as part of the message, the same as described relative to FIG. 3.

Figure 5:
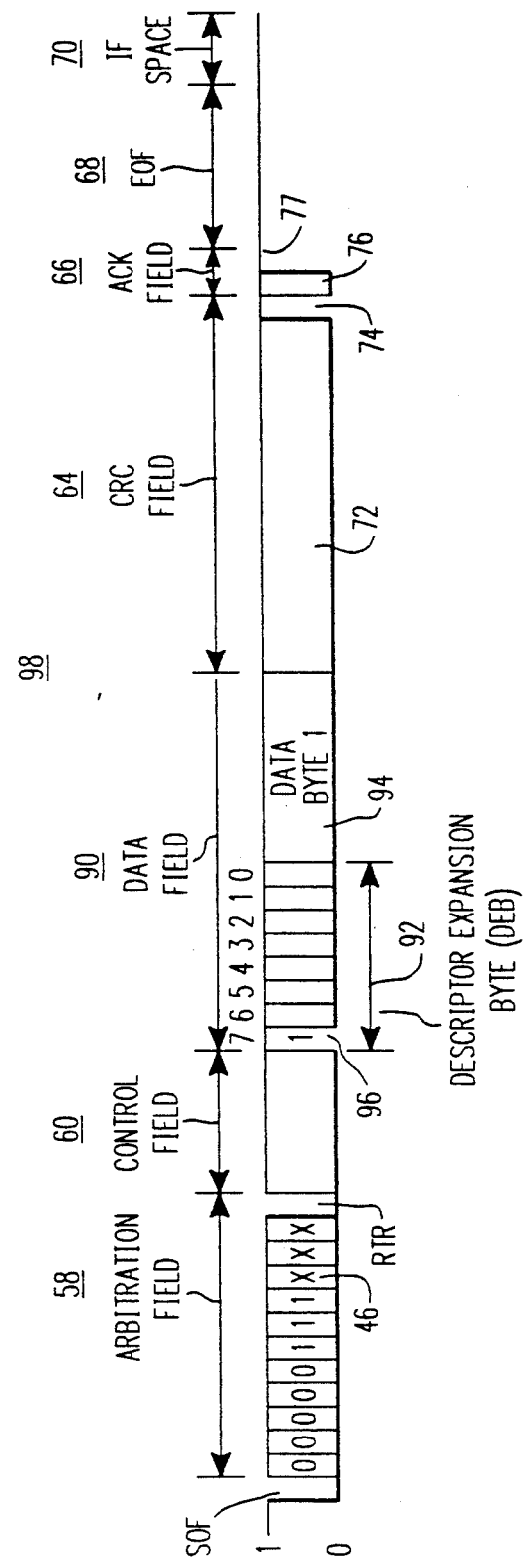
FIG. 5 illustrates a message format which implements initial remote device log-on methods of the invention.

When a remote node is initially added to bus 18, the new node sends a message to the central communication node 12 to indicate that it is now connected to bus 18, and it also sends an eleven- bit identification number 97, shown in FIG. 2, which has been assigned to the node, which will hereinafter identify messages sent by the node, as well as the message priority, as hereinbefore explained. This type of log-on procedure utilizes a control frame 98 illustrated in FIG. 5, which is similar to control frame 88 shown in FIG. 4, and the reference numbers used in control frame 88 are used to identify like portions of frame 98. Control frame 98 is differentiated from control frame 88 as the logging-on remote node places the remote log-on eleven- bit identification number 97 in the arbitration field 58. When the central communication node 12 receives control frame 98 it interprets bits 0–2 of DEB 92 and bits 0–7 of byte 94 as the eleven bit identifier associated with the logging-on node, and central communication node 12 stores this identification for further communication with the logging-on node.

We claim:

1. A method of two-way communication in a refrigeration system between a central communication node and remote nodes via serial data bus using a modified Controller Area Network protocol having a fixed message frame format which includes a combined identification and arbitration field and a data field, comprising the steps of:

converting a predetermined portion of the data field of each message frame to a permanent data descriptor expansion byte (DEB), setting a predetermined bit of said DEB to a first logic level in at least the first frame of a message, to indicate a control frame, loading information descriptive of the message in the remaining bits of said DEB, and in the remaining data field, of said control frame, said message descriptive information in the data field of the control frame including an algorithm and algorithm block number associated with the data being transmitted, when the data is being transmitted from and to the central communication node, setting said predetermined bit of said DEB to a second logic level in at least one subsequent frame of the message, to indicate a data frame, loading a block of data in the data field of each data frame, and loading index information in the remaining bits of the DEB in each data frame which is specific to the data of the associated data frame.

2. A method of two-way communication in a refrigeration system between a central communication node and remote nodes via serial data bus using a modified Controller Area Network protocol having a fixed message frame format which includes a combined identification and arbitration field and a data field, comprising the steps of:

converting a predetermined portion of the data field of each message frame to a permanent data descriptor expansion byte (DEB), setting a predetermined bit of said DEB to a first logic level in at least the first frame of a message, to indicate a control frame, loading information descriptive of the message in the remaining bits of said DEB, and in the remaining data field, of said control frame, said message descriptive information in the data field of the control frame of a message transmitted by a remote node indicating when the message is a request for data to be sent from the central communication node, setting said predetermined bit of said DEB to a second logic level in at least one subsequent frame of the message, to indicate a data frame, loading a block of data in the data field of each data frame, and loading index information in the remaining bits of the DEB in each data frame which is specific to the data of the associated data frame.

3. The method of claim 2 wherein the data field of the data frames of the request-for-data message identifies the information to be sent.

4. A method of two-way communication in a refrigeration system between a central communication node and remote nodes via serial data bus using a modified Controller Area Network protocol having a fixed message frame format which includes a combined identification and arbitration field and a data field, comprising the steps of:

converting a predetermined portion of the data field of each message frame to a permanent data descriptor expansion byte (DEB), setting a predetermined bit of said DEB to a first logic level in at least the first frame of a message, to indicate a control frame, loading information descriptive of the message in the remaining bits of said DEB, and in the remaining data field, of said control frame, said message descriptive information in the data field of the control frame of a message transmitted by a remote node indicating when the message is sending data to be stored at the central communication node, setting said predetermined bit of said DEB to a second logic level in at least one subsequent frame of the message, to indicate a data frame, loading a block of data in the data field of each data frame, and loading index information in the remaining bits of the DEB in each data frame which is specific to the data of the associated data frame.

5. The method of claim 4 wherein the data field of a data frame of the message includes an identification of the data being sent followed by the information.

6. The method of claim 5 wherein the data identification and associated data are in blocks each having a like predetermined number of bytes, with the first byte of each block being a data identifier and with the remaining bytes of each block being the identified data.

7. A method of two-way communication in a refrigeration system between a central communication node and remote nodes, with one of the nodes being a data logger, via serial data bus using a modified Controller Area Network protocol having a fixed message frame format which includes a combined identification and arbitration field and a data field, comprising the steps of:

converting a predetermined portion of the data field of each message frame to a permanent data descriptor expansion byte (DEB), setting a predetermined bit of said DEB to a first logic level in at least the first frame of a message, to indicate a control frame, loading information descriptive of the message in the remaining bits of said DEB, and in the remaining data field, of said control frame, said message descriptive information in the data field of the control frame of a message transmitted by a remote node indicating when the message is a request for a data logger transmission, setting said predetermined bit of said DEB to a second logic level in at least one subsequent frame of the message, to indicate a data frame, loading a block of data in the data field of each data frame, and loading index information in the remaining bits of the DEB in each data frame which is specific to the data of the associated data frame.

8. The method of claim 7 wherein the data field of the data frames of the message include a message to be stored at the central node, and including the step of storing the message at the central node along with an identification of the remote node which sent the message.

* * * * *